US008954207B1

(12) United States Patent
Anzalone et al.

(10) Patent No.: US 8,954,207 B1
(45) Date of Patent: Feb. 10, 2015

(54) METHOD OF ENHANCING ON-BOARD STATE ESTIMATION USING COMMUNICATION SIGNALS

(71) Applicant: The United States of America as Represented by the Administrator of the National Aeronautics and Space Administration, Washington, DC (US)

(72) Inventors: Evan John Anzalone, Huntsville, AL (US); Jason C. H. Chuang, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/020,326

(22) Filed: Sep. 6, 2013

(51) Int. Cl.
*B64G 1/24* (2006.01)
*B64G 3/00* (2006.01)
*G01C 21/24* (2006.01)

(52) U.S. Cl.
CPC .................................. *G01C 21/24* (2013.01)
USPC .............................. 701/13; 701/469; 701/531

(58) Field of Classification Search
None
See application file for complete search history.

(56) References Cited

U.S. PATENT DOCUMENTS

| 4,797,677 | A * | 1/1989 | MacDoran et al. | 342/352 |
| 6,721,658 | B2 * | 4/2004 | Stadter et al. | 701/482 |
| 2007/0085735 | A1 * | 4/2007 | Bay | 342/357.02 |
| 2008/0059009 | A1 * | 3/2008 | Fedora et al. | 701/13 |
| 2008/0151913 | A1 * | 6/2008 | El-Damhougy et al. | 370/401 |
| 2009/0018762 | A1 * | 1/2009 | Sheikh | 701/200 |
| 2009/0053995 | A1 * | 2/2009 | Moore, III | 455/13.1 |

OTHER PUBLICATIONS

NPL-Deep Space Internet. Accessed on Mar. 12, 2014 from: http://www.nasa.gov/home/hqnews/2008/nov/HQ_08-298_Deep_space_internet.html. Original publication date of webpage was on Nov. 19, 2008.*
NPL-Space Packet Protocol. Accessed on Mar. 11, 2014 from: http://public.ccsds.org/publications/archive/133x0b1c2.pdf. Original webpage publication is Apr. 23, 2013. Original Document in 2003 and PDF created on Sep. 7, 2010 and last modified on Sep. 26, 2012.*

(Continued)

*Primary Examiner* — John R Olszewski
*Assistant Examiner* — Jess Whittington
(74) *Attorney, Agent, or Firm* — Peter J. Van Bergen; James J. McGroary (57) ABSTRACT

A method of enhancing on-board state estimation for a spacecraft utilizes a network of assets to include planetary-based assets and space-based assets. Communication signals transmitted from each of the assets into space are defined by a common protocol. Data is embedded in each communication signal transmitted by the assets. The data includes a time-of-transmission for a corresponding one of the communication signals and a position of a corresponding one of the assets at the time-of-transmission. A spacecraft is equipped to receive the communication signals, has a clock synchronized to the space-wide time reference frame, and has a processor programmed to generate state estimates of the spacecraft. Using its processor, the spacecraft determines a one-dimensional range from itself to at least one of the assets and then updates its state estimates using each one-dimensional range.

21 Claims, 3 Drawing Sheets

(56) References Cited

OTHER PUBLICATIONS

Anzalone, E.J. & Chuang, J.C.H., Conceptual Design of a Communication-based Deep Space Navigation Network, AIAA 2012-5186, AIAA Space 2012 Conf, Sep. 11, 2012, Pasadena, CA.

Anzalone, E.J., Agent and Model-Baded Simulation Framework for Deep Space Navigation Design and Analysis, Thesis, Feb. 25, 2013, p. 1-277, Georgia Institute of Technology, Atlanta, GA.

Farrel, S. et al., Delay and Disruption Tolerant Networking, Artech House, 2006.

* cited by examiner

FIG. 1

| Packet Content | | Byte Length |
|---|---|---|
| Packet Primary Header | | 6 |
| Packet Data Field | Packet Secondary Header User Data Field | 0 to 65536<br>65536 - Secondary Header Length |

FIG. 2A

| Data Type | | Number of Bits |
|---|---|---|
| Packet Version | | 3 |
| Packet ID | Packet Type | 1 |
| | Secondary Header Flag | 1 |
| | Application Process ID | 11 |
| Packet Sequence Control | Sequence Flag | 2 |
| | Packet Sequence Count | 14 |
| Packet Data Length | | 16 |

METHOD OF ENHANCING ON-BOARD STATE ESTIMATION USING COMMUNICATION SIGNALS

STATEMENT OF GOVERNMENT INTEREST

The invention described herein was made in the performance of official duties by employees of the United States Government and may be manufactured and used by or for the Government of the United States of America for governmental purposes without the payment of any royalties thereon or therefor.

FIELD OF THE INVENTION

The invention relates generally to navigation in space, and more particularly to a method that uses communication signals transmitted by ground and space-based assets over a deep space communication network to enhance on-board state estimation thereby facilitating autonomous space navigation.

BACKGROUND OF THE INVENTION

Since the first successful insertion of a man-made object into orbit about the Earth, engineers and scientists have continued to develop more complex satellites performing increasingly complex missions. The functionality of space-borne assets has increased dramatically from the simple beacon transmission of the Sputnik satellite. As the capability of launch systems and satellite components increase, it is possible to put larger and more complex hardware into orbit. With each mission and continued advancement of spacecraft technology, missions have ventured farther out from Earth to our planetary neighbors, such as the Messenger mission to Mercury, and distant locales, such as the New Horizons mission to Pluto and Charon. As the missions and spacecraft have become more complex, the requirements on spacecraft navigation become more stringent.

Even with advanced celestial dynamics models and navigation measurements, it is not possible to perfectly predict spacecraft ephemeris (trajectory over time). This is due to the complexity of the system being modeled, and assumptions used in the modeling of dynamic effects in deep space. As such, there is inherent error in predicting and propagating a spacecraft's trajectory as accuracy is limited due to a range of issues from gravitational model uncertainty to finite precision computations. Due to these effects, most spacecraft mission concepts include several trajectory correction maneuvers (TCM) in order to tweak the spacecraft's orbit. These corrections are needed to ensure correct planetary flyby conditions, orbit insertions, and correct for initial orbit insertion errors. The primary information used to plan a TCM is a comparison between the navigation data and the design trajectory. The effectiveness of the TCM is limited by the accuracy of the estimated state and other on-board systems. Orbit observations allow for an analysis of the as-flown trajectory compared to the planned TCM. Ground analysis compares the observed to the predicted state and desired state to ascertain if any thrust is needed during the planned trajectory. Improvements in both navigation accuracy and state update rate will increase knowledge of spacecraft position. This will further reduce the need for large TCMs by the minimization of initial state error and increasing the effectiveness of corrections resulting from increased knowledge of the current state. Overall error is still limited by the assumptions made in the predicted dynamics, which high precision navigation dynamics models can improve.

In addition to trajectory planning concerns, some of the most difficult missions involve landing a probe or rover on an extraterrestrial planetary surface. For scientific missions, it is desired to arrive in a general vicinity of scientific interest or region. But as man begins to push outwards from Earth, the need to deliver supplies to a Lunar or Martian outpost will increase. It will be increasingly important to accurately land these resources close to a predefined location (nearby to the human presence, or within range of any local surface vehicles) to minimize the time and effort required to retrieve the supplies.

Landing systems typically rely on techniques involving aerobraking, braking thrusters, or parachutes to gently land with minimal control during descent. As such, it is paramount to have knowledge of the spacecraft's state well ahead of planetary entry. This knowledge allows ground operators to predict the spacecraft's entry vector and estimated landing site. Accordingly, by increasing accuracy of the navigation knowledge, ground operators can issue more precise thrusting commands to the spacecraft to tune its entry trajectory. Thus, increased navigation performance allows for the capability of precise directed planetary entries and landing.

The navigation problem of ascertaining a vehicle's current position and velocity is a very complex problem. This is due to uncertainties in dynamics models, measurement accuracy, and resolution limitations. For ground navigation, this can be performed relatively accurately with imprecise measurements (such as simply using a map, compass, and observations of the landscape). But as spacecraft travel farther and farther from Earth into deep space, navigation becomes increasingly difficult due to limited observation data and finite precision. As a spacecraft's distance from Earth increases, maintaining a relative positioning accuracy requires continual improvement in observation resolution. At the most fundamental level, numerical precision and computational accuracy limit this capability due to, for example, uncertainty in the dynamic models, physical spacecraft limitations, and the measurement process.

One of the main complexities in the deep space navigation problem is a product of the environment itself and the distances involved. Typically, deep space navigation is performed by Earth-based assets. However, the time for a signal to reach its destination can vary from several minutes to several hours based on the geometry involved. The transmission travel time, along with the time required for post-processing and analysis on the ground, produces a latency in any state measurement based on this observation. As such, a calculated navigation solution is a measurement of where the spacecraft was and not where it currently is. This delay also affects transmission capabilities, in that the ground-based assets must be "pointed" (i.e., pointing direction of an asset's antenna) based on the predicted delay and where the satellite will be when the signal has traveled such a distance. Ground assets must therefore track ahead of the spacecraft. Additionally, the efficiency of transmitting to a spacecraft is driven by knowledge of the spacecraft's position, which can drive pointing losses that can limit data transmission rates. As navigation fixes are generated, errors in pointing and data transmission can be reduced.

Due to the issues involved with signal travel and deep space communication, the ideal deep space navigation solution involves performing navigation autonomously on-board a spacecraft. There are several obstacles to using on-board satellite systems to perform complex navigation and state estimation routines. Two considerable obstacles are algorithm development and the required hardware and computational systems. Due to the long planning time associated with deep space missions and the desire to use flight-proven systems, the amount of computing power limits the implementation of advanced algorithms. In addition, hardware availability is an issue due to requirements on radiation hardening that also limits on-board memory storage. Due to these limitations, it is difficult to develop autonomous algorithms of sufficient capability to be run on memory-constrained and processing-constrained systems.

Additionally, spacecraft are physically constrained due to launch vehicle limitations related to vehicle volume and mass. This constrains which and how many instruments can be installed on the spacecraft. For example, to transmit information back to Earth, a large directional antenna is required. Still further, powering sophisticated hardware becomes a critical issue as a spacecraft travels farther from the sun. That is, a spacecraft's electrical power is generally derived using solar energy. However, solar flux reduces proportionally to the square of the distance. Thus, solar panels are decreasingly useful the farther a spacecraft travels from the sun. The availability of on-board power and its distribution across multiple subsystems limits the use of high-power computing resources.

To summarize, any on-board navigation hardware needs to have limited power requirements and a minimal effect on other spacecraft operations. Due to these factors, deep space navigation is inherently difficult due to the environment involved, the signal delay, and the tight spacecraft physical and operational constraints. Many methods of navigation currently used are external to the spacecraft. However, as autonomy and navigational accuracy requirements increase, it is necessary to shift navigation-related functions to an on-board scheme. This is particularly important in scenarios where the required response time for the spacecraft is faster than the time required for communication to Earth with ground-based external analysis. For this to happen, a spacecraft must be able to accurately update its own state estimate in order to accomplish it prescribed mission.

SUMMARY OF THE INVENTION

Accordingly, it is an object of the present invention to provide a method that facilitates on-board state estimation for a spacecraft travelling in deep space.

Another object of the present invention is to provide a method that facilitates on-board state estimation for a spacecraft using existing assets and hardware.

Other objects and advantages of the present invention will become more obvious hereinafter in the specification and drawings.

In accordance with the present invention, a method of enhancing on-board state estimation for a spacecraft utilizes a network of assets to include planetary-based assets and space-based assets. Communication signals transmitted from each of the assets into space are defined by a common protocol. Data is embedded in each communication signal transmitted by the assets. The data includes a time-of-transmission for a corresponding one of the communication signals and a position of a corresponding one of the assets at the time-of-transmission. Each time-of-transmission is synchronized to a space-wide time reference frame. Each position is defined in terms of a space-wide location reference frame. A spacecraft is equipped to receive the communication signals, has a clock synchronized to the space-wide time reference frame, and has a processor programmed to generate state estimates of the spacecraft. Using its processor, the spacecraft determines a one-dimensional range from itself to at least one of the assets. That is, the processor uses the data from the communication signals transmitted by the asset to determine each such one-dimensional range. Then, using its processor, the spacecraft updates its state estimates using each one-dimensional range.

BRIEF DESCRIPTION OF THE DRAWINGS

Other objects, features, and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention provides a new method of providing data to a spacecraft such that the spacecraft's existing state estimation/update routines are enhanced to thereby generate more accurate "own state" information that, in turn, can be used by the spacecraft's navigation system. That is, the present invention provides the necessary data that allows a spacecraft to navigate autonomously. In addition and as will be explained later herein, the present invention provides for the evaluation/selection of sources for the data supplied to a spacecraft as it travels into deep space. That is, as a spacecraft moves further and further from Earth, the present invention can utilize data sources that are closer to its current position than Earth.

Figure 1:
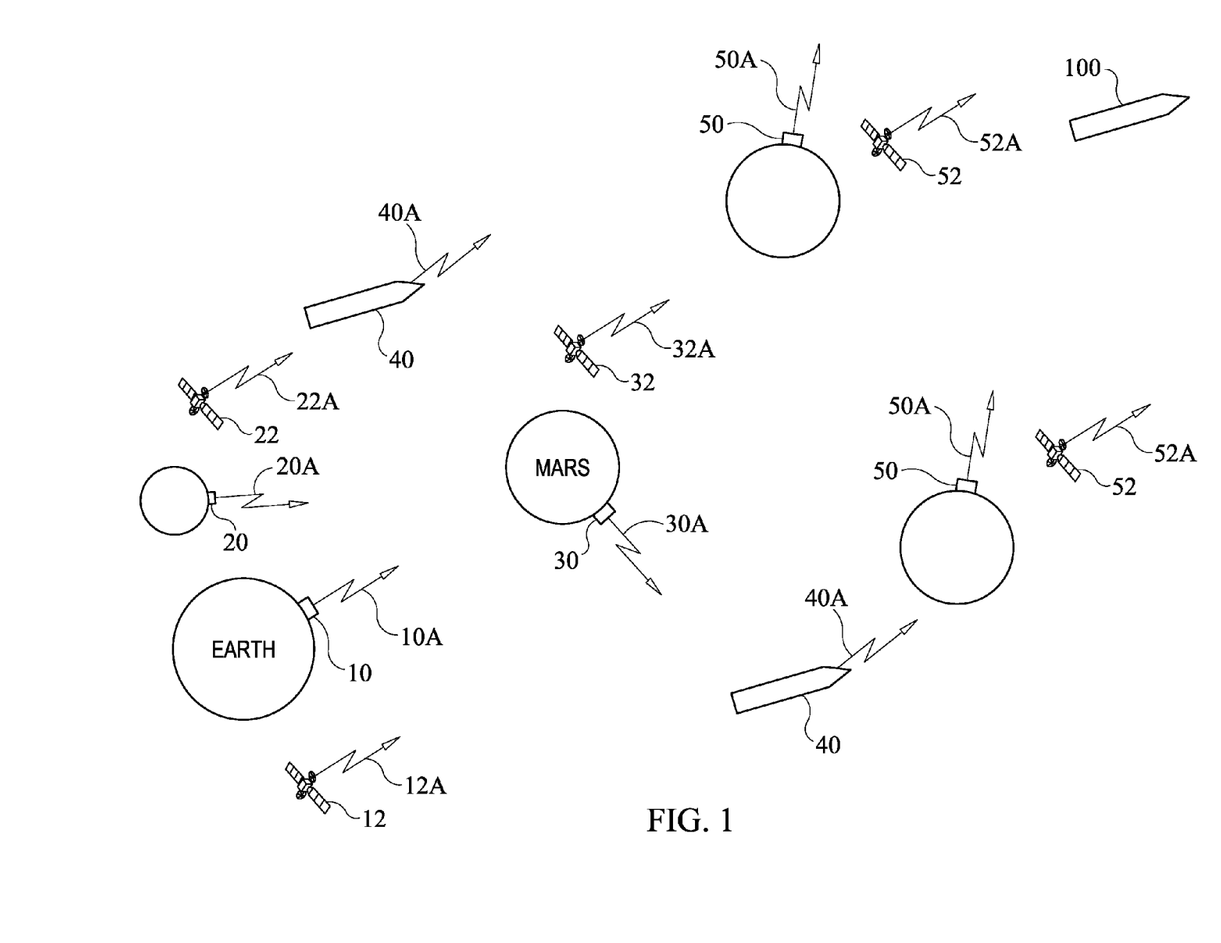
FIG. 1 is a schematic view of an exemplary network of assets that are part of an interplanetary deep space communication network used to provide and transfer data used by a spacecraft to perform on-board state estimation in accordance with the present invention.

Referring now to the drawings and more particularly to FIG. 1, a schematic view of an exemplary interplanetary deep space communication network used by the present invention is illustrated. The communication network includes a number of ground-used assets and space-based assets. As used herein, the term "asset" refers to any fixed or moving system/vehicle that can generate/transmit communication signals into space. Thus, communication transmission assets include Earth-based stations (e.g., a Deep Space Network antenna), Earth-orbiting satellites 12 (e.g., Global Positioning System or Tracking Data and Relay Satellites), moon-based stations 20, Moon-orbiting satellites 22, Mars-based stations 30 (e.g., Mars Exploration Rovers), Mars-orbiting satellites 32, navigating space vehicles 40, and any other planetary-based stations 50 and their orbiting satellites 52. Communication transmissions can occur within radio frequency bands, microwave frequency bands, and/or optical frequency bands, without departing from the scope of the present invention. It is to be understood that the number and types of communication assets are not limitations of the present invention.

For purpose of describing the present invention, a traveling spacecraft 100 will use data in the communication signals transmitted from one or more of the assets in the communication network in its state estimates/updates. In this way, spacecraft 100 develops its "own state" that can be used by its on-board navigation system that is programmed with a route for its intended mission. These "own state" updates are developed in an on-going and autonomous fashion thereby leading to autonomous navigation of spacecraft 100. While the present invention will be described relative to spacecraft 100, it is to be understood that the present invention can be (and typically would be) implemented by the other assets in the communication network in a similar fashion to that described herein to allow for maximum navigation capability among all assets.

As mentioned above, each ground-based and space-based asset in the communication network transmits communication signals (e.g., communication signals 10A, 12A, 20A, etc.) into space. The hardware structures of such communication systems are well known in the art and are not limitations of the present invention. The present invention integrates information/data that is readily-available (at the time-of-transmission of each communication signal) into the communication signal's data structure. At a minimum, the data transmitted in each communication signal includes the signal's time-of-transmission and the position of the asset at the time-of-transmission. The time-of-transmission must be synchronized across the entire communication network. Such synchronization is achieved through the use of a standardized time reference frame such as the Barycentric Dynamical Time reference frame (also known as "TBD") that is well known in the art. Similarly, the transmitting assets position must be defined in terms of a standardized inertial location reference frame. As will be explained further below, asset time-of-transmission and position data will be processed on-board spacecraft 100 in order to perform autonomous state estimates/updates. This is in contrast to current approaches utilizing ground asset-based techniques and processing to provide state updates to a traveling spacecraft.

In accordance with the present invention, each communication signal has its time-of-transmission and the corresponding asset's position embedded therein. Since the communication signals from any one or more of the assets can be used by spacecraft 100 in the present invention, the communication signals must be defined in accordance with a common data-packaging protocol. Further, the structure of each communication signal must integrate with data transmission protocols satisfying international space data standards. Space data packaging and data transmission protocols are controlled by the Consultative Committee for Space Data Systems (CCSDS).

Figure 2A:
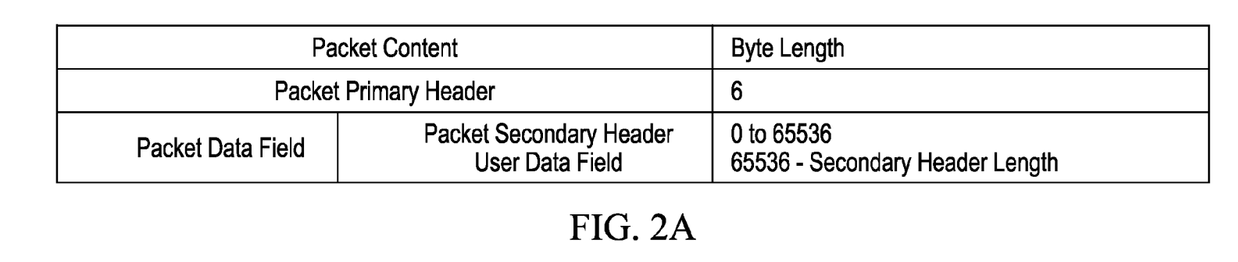
FIG. 2A depicts the overall structure of a data packet defined by the Space Packet Protocol.
Figure 2B:
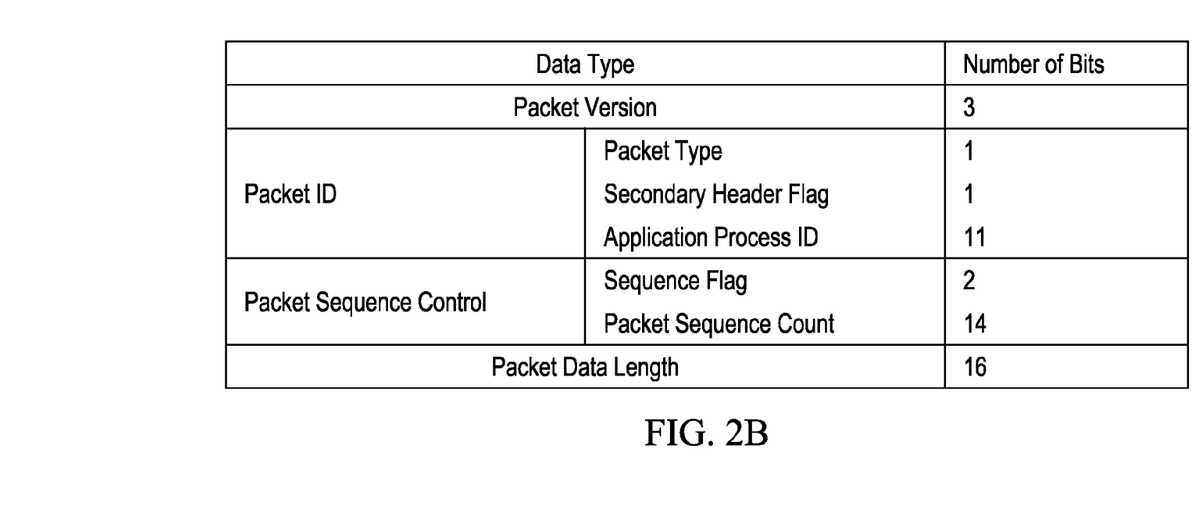
FIG. 2B depicts the structure of the primary header content for a data packet defined by the Space Packet Protocol.

A suitable international standard for assets used by the present invention is called the Space Packet Protocol. This protocol captures the basic unit of data transfer between assets and is embedded within other transmission protocols. It consists of a primary header, a potential secondary header, and the user data field. An overview of the Space Packet is given in FIG. 2A and the primary header content is described in FIG. 2B. FIGS. 2A and 2B illustrate the required data that must be included in every Space Packet in order to be properly processed and adhere to the standards. The total header has a length of sixteen bits and includes a diverse data set: the protocol version, the packet type, whether there is a secondary header, the identification of the application process, packet sequence flag and count, and a number of bits in the total packet. This information allows for successful parsing and decomposition of the transmitted data.

To enable interoperability with the standard Space Packet, the present invention embeds the secondary header with information generated and/or available at each transmitting asset. Using already defined pieces of known communication protocols fosters integration across multiple missions and vehicles by simplifying method implementation. Additionally, integration into the standard protocols reduces additional design work and fosters collaboration.

For effective communication from (and between) the assets in the interplanetary deep space communication network shown in FIG. 1, the data transmission/transfer protocol must consider and compensate for the potentially long travel times between assets and to spacecraft 100. In general, a family of data transmission/transfer protocols that have been proven (i.e., ground tested) effective for deep space communication are known as delay and disruption tolerant network protocols or DTN protocols as they are known. Some of the most promising DTN protocols are bundle protocols and the Licklider Transmission Protocol (LTP). Details and reviews of the various protocols can be found in the book entitled "Delay and Disruption Tolerant Networking," S. Farrel et al, Artech House, 2006.

Briefly, the bundle protocol is designed for a large network of intercommunicating assets. As the assets/nodes communicate, bundles are passed from node-to-node until the bundle reaches its final destination. A bundle is defined as a closed group of data that combine both reported data and status. Additionally, a bundle can include a series of commands and settings meant for a scientific payload or rover. The progress of the bundles is tracked through the network, as is the ownership of the packet, to insure it has reached its destination before it is cleared from the transmitting asset's memory. The protocol is also developed to optimize retransmissions due to lost pieces of the bundles and efficiently only retransmit. The bundle protocol proves incredibly useful in integrating data from several distant sources such as commanding and receiving data from a scientist on Earth to a Mars rover, which goes through several hops through relays and ground processing networks.

LTP is an implementation of DTN for point-to-point communication for long travel time deep space links. This protocol is developed in contrast to standard CCSDS file delivery protocols which are typically implemented on a mission-to-mission basis. LTP was developed to be a standard development of a transfer protocol implementing many of the same functions as CCSDS's file delivery protocols. The main concept of LTP is the use of freezing timeout timers when a spacecraft knows that it cannot receive data due to, for example, planetary eclipses. This reduces unnecessary timeouts and retransmits of data.

Still further, a hybrid DTN protocol could be developed from a combination of LTP and DTN protocols to enable a very efficient method of transferring data at large distances while increasing data throughput by minimizing redundant transmissions. This would be especially useful as the deep space communication network continues to grow and additional ground and space assets are integrated into the network.

Figure 3:
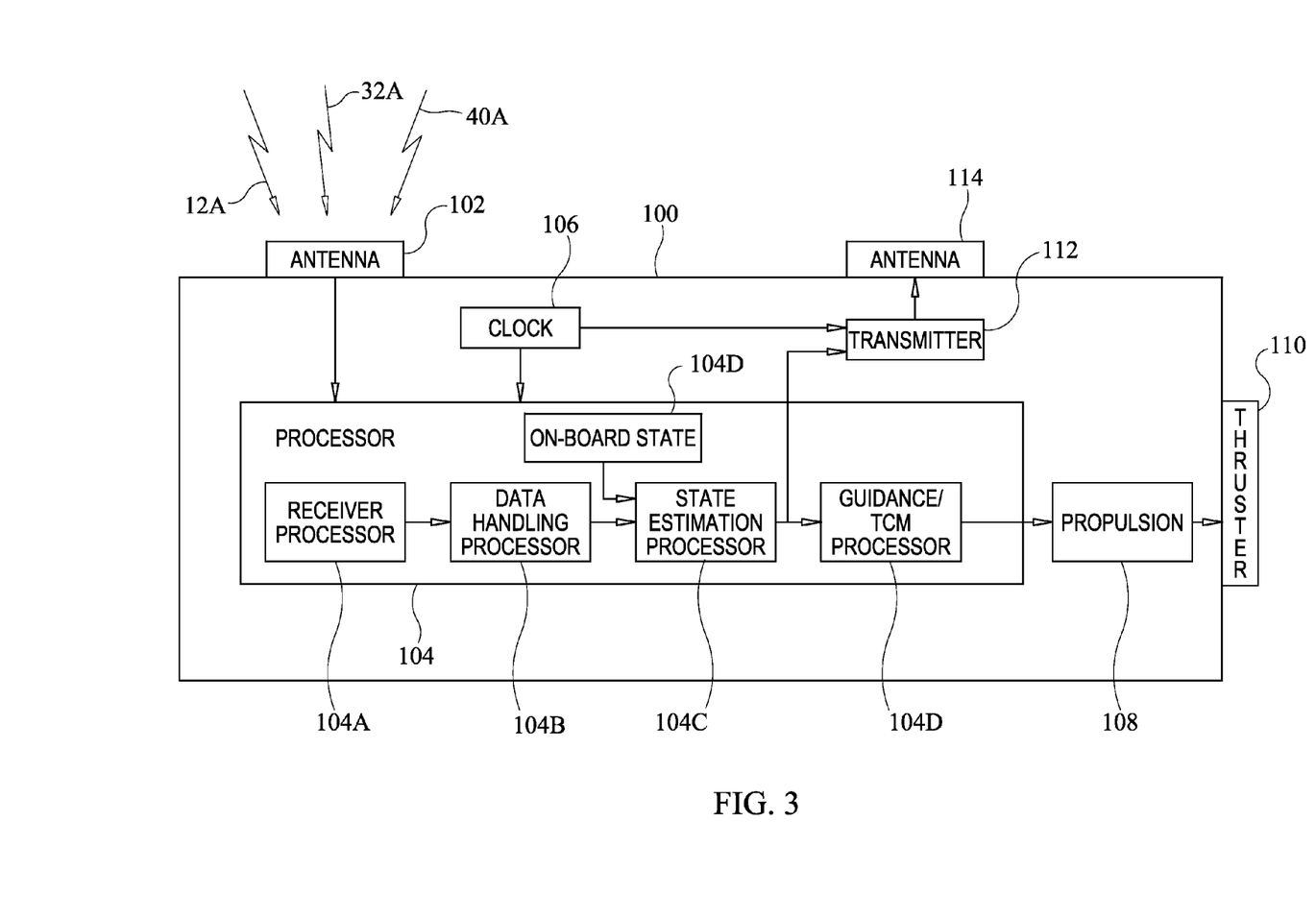
FIG. 3 is a schematic view of a spacecraft's on-board systems used in the performance of on-board state estimates/updates in accordance with the present invention.

Spacecraft 100 uses communication signals from one or more of the assets in the communication network to autonomously estimate/update its state estimates. Accordingly, spacecraft 100 must be equipped with certain systems. Referring now to FIG. 3, the systems needed by spacecraft 100 in the implementation of the present invention are depicted schematically. An antenna 102 is used to receive communication signals from various assets in the communication network (e.g., communication signals 12A, 32A, 40A). Antenna 102 provides the communication signal "packets" to an on-board processor 104 that can be one or more processors carrying out a variety of functions. In terms of the present invention, a receiver processor 104A time stamps a received data packet with the current time from an on-board clock 106 that is synchronized to the same time frame of reference used by all of the other assets in the communication network. A data handling processor 104B extracts the header data related to a transmitting asset's position, time-of-transmission, etc. The header data is passed to a state estimation processor 104C that also receives an on-board state 104D propagated to the current time. An updated state estimate is generated at processor 104C using the data extracted from the header. The updated state estimate can be provided to a guidance/TCM processor 104E that uses the updated state estimate in guidance algorithms, TCM algorithms, etc. Processor 104E generates a command for propulsion 108 that, in turn, controls one (or more) thruster 110 for steering control of spacecraft 100 to keep it on course for its intended mission. The spacecraft's updated position (or entire state estimate) can also be provided to an on-board transmitter 112 (along with a current time-of-transmission from clock 106) for transmission via an antenna 114. In this way, other assets can utilize the updated state of spacecraft 100 in their own state estimate updates.

The basic data packet in an asset's communication signal includes the asset's inertial position at the signal's time-of-transmission as well as the time-of-transmission. By placing this data in the communication signal's header (e.g., the secondary header when using the Space Packet Protocol), processor 104 can readily parse the data from the "communication" information in the signal. This will allow conventional communication data processing (not shown in the figures) to be carried out simultaneously without modification to existing systems. Using an asset's position/time-of-transmission data, spacecraft 100 can update its state estimate. More specifically, processor 104 records/logs a time-of-receipt for each incoming communication signal using its clock 106. Processor 104 determines a one-dimensional range from spacecraft 100 to the asset associated with the communication signal using the (secondary header) data in the communication signal, the time-of-receipt thereof, and a current position of spacecraft defined in its on-board state 104D. Note that stochastic behavior of clock 106 would typically be modeled and integrated into the processing as would be understood by one of ordinary skill in the art. The calculated one-dimensional range is then used by processor 104 to update the position of spacecraft 100 in its state estimates.

While the above process has been described for a communication signal from just one asset, the same process is applied (and typically will be applied) to communication signals from multiple assets. In this way, a plurality of one-dimensional ranges to different assets can be used to update the position of spacecraft 100 in its state estimates to thereby improve the position estimating update of spacecraft 100. Multiple ranges can also be used to generate range rates for use in the state estimate updates. Further, since this same process can be implemented on all assets in the communication network, all assets in the communication network (to include spacecraft 100) are constantly updating their own position state. Thus, all assets to include spacecraft 100 are constantly reducing any position errors in their state estimates in an autonomous fashion such that mission navigation can proceed autonomously.

Spacecraft 100 could utilize communication-signal-embedded data from all assets in the communication network. However, practically, this is not necessary or the most efficient use of resources. That is, as spacecraft 100 travels deeper into space, the time for it to receive communication signals increases. The uncertainties in the associated time delay means that the position data in a communication signal from a distant asset is not as reliable as the position from a near asset. Accordingly, processor 104 can be programmed to evaluate, discriminate and/or select just certain communication signals to reduce the data set for one-dimensional range determinations based on distance and individual asset's knowledge. For example, this could include trusting a ground state with a well-defined location more than another passing spacecraft. The discrimination/selection process can be implemented in a variety of ways without departing from the scope of the present invention. For example, an asset's proximity to spacecraft 100 could be used as a deciding factor. Such proximity determination could be based simply on the time differential between a communication signal's time-of-transmission and its time-of-receipt logged at spacecraft 100, i.e., processor 104 is provided with a time differential threshold such that processor 104 ignores the transmitting asset's (secondary header) data for any communication signal yielding a time differential that exceeds the threshold.

A communication signal's data packet can include additional data used in the determination of the one-dimensional range calculation and/or state estimate update. For example, an asset could embed information in its communication signal (e.g., in the secondary header when using the Space Packet Protocol) related to errors or uncertainty in its time-of-transmission or position. The data could also include the pointing direction of the asset's antenna at the time of transmission. Still further, a transmitting asset can include its own current state estimate in the data packet as well as gravitational information that might be impacting the asset's position. A data packet transmitted from an asset could also include data that the asset received from other assets in the communication network.

Since all assets in the communication network participate in the "own state" updates, an asset located relatively close to spacecraft 100 could engage in a back-and-forth "conversation" to generate position fixes relative to one another for ultimate convergence to a nominal solution. The nominal solution is embedded in each communication signal transmitted by the asset and spacecraft 100 thereby improving state estimate updates for other assets in the communication network.

The advantages of the present invention are numerous. With development of increasingly complex spacecraft missions, the need for and advantages afforded by navigation methods also increases. The present invention is an integral component of ground-analysis-independent deep space navigation that takes advantage of the primary function of a space communication network. The communication network based concept described herein operates by embedding asset-local data into communication packet headers being sent amongst assets. The performance of this architecture improves with increases in the size of the operating network. As the in-space communication infrastructure continues to grow with the continued use and development of multi-purpose relay satellites, the frequency of inter-spacecraft communication also increases. This growing network allows for more frequent and autonomous state estimate updates thereby improving deep space navigation performance, capability, and range.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of enhancing on-board state estimation for space-based assets, comprising the steps of:
   providing a network of assets to include planetary-based assets and space-based assets;

transmitting communication signals from each of said assets into space, each of said communication signals defined by a common protocol;

embedding data in each of said communication signals transmitted by each of said assets, said data including a time-of-transmission for a corresponding one of said communication signals and a position of a corresponding one of said assets at said time-of-transmission, each said time-of-transmission being synchronized to a space-wide time reference frame, each said position defined in terms of a space-wide location reference frame;

providing a spacecraft equipped to receive said communication signals and transmit own-spacecraft communication signals into space, said spacecraft having a clock synchronized to said space-wide time reference frame and having a processor programmed to generate state estimates of said spacecraft;

determining, using said processor, one-dimensional range from said spacecraft to at least one of said assets, said step of determining using said data from said communication signals transmitted by said at least one of said assets;

updating, using said processor, said state estimates using each said one-dimensional range, wherein an updated state estimate is generated, and wherein said updated state estimate includes an updated position for said spacecraft;

embedding, in one of said own-spacecraft communication signals, said updated position for said spacecraft and a current time-of-transmission from said clock; and transmitting, from said spacecraft, said one of said own-spacecraft communication signals wherein said updated position and said current time-of-transmission are available for use by said assets in updating said position thereof used in said step of embedding data.

2. A method according to claim 1, wherein said common protocol comprises a Space Packet Protocol.

3. A method according to claim 1, wherein said step of transmitting is carried out in accordance with a delay and disruption-tolerant networking protocol.

4. A method according to claim 1, wherein said step of determining includes the step of parsing, using said processor, said data from each of said communication signals received by said spacecraft.

5. A method according to claim 1, wherein said space-wide time reference frame comprises a Barycentric Dynamical Time reference frame.

6. A method according to claim 1, wherein said step of transmitting occurs over a frequency band selected from the group consisting of radio frequency bands, optical frequency bands, and microwave frequency bands.

7. A method according to claim 1, wherein said data further comprises at least one of an uncertainty metric associated with said time-of-transmission, an uncertainty metric associated with said position, a pointing direction of an antenna used during said step of transmitting, a current state estimate of said corresponding one of said assets associated with said data, gravitational information impacting said corresponding one of said assets associated with said data, and said data associated with others of said assets.

8. A method according to claim 1, wherein said step of determining is performed for selected ones of said assets predicated on a plurality of factors to include proximity of said assets to said spacecraft and said assets' type as being one of said planetary assets and said space-based assets.

9. A method of enhancing on-board state estimation for space-based assets, comprising the steps of:

providing a network of assets to include planetary-based assets and space-based assets, each of said assets generating communication signals defined by a packet structure that includes a primary header field and a secondary header field;

embedding data in each said secondary header field for each of said communication signals, said data including a time-of-transmission for a corresponding one of said communication signals and a position of a corresponding one of said assets at said time-of-transmission, each said time-of-transmission being synchronized to a space-wide time reference frame, each said position defined in terms of a space-wide location reference frame;

transmitting said communication signals from each of said assets into space at said time-of-transmission associated therewith;

providing a spacecraft in space, said spacecraft being equipped to receive said communication signals and transmit own-spacecraft communication signals into space, said spacecraft having a clock synchronized to said space-wide time reference frame for generating a time-of-receipt for each of said communication signals received by the spacecraft and having a processor programmed to generate state estimates of said spacecraft;

determining, using said processor, one-dimensional range from said spacecraft to at least one of said assets, said step of determining using said data from said communication signals transmitted by said at least one of said assets and each said time-of-receipt associated therewith;

updating, using said processor, said state estimates using each said one-dimensional range, wherein an updated state estimate is generated, and wherein said updated state estimate includes an updated position for said spacecraft;

embedding, in one of said own-spacecraft communication signals, said updated position for said spacecraft and a current time-of-transmission from said clock; and transmitting, from said spacecraft, said one of said own-spacecraft communication signals wherein said updated position and said current time-of-transmission are available for use by said assets in updating said position thereof used in said step of embedding data.

10. A method according to claim 9, wherein said step of transmitting is carried out in accordance with a delay and disruption-tolerant networking protocol.

11. A method according to claim 9, wherein said step of determining includes the step of parsing, using said processor, said data from each of said communication signals received by said spacecraft.

12. A method according to claim 9, wherein said space-wide time reference frame comprises a Barycentric Dynamical Time reference frame.

13. A method according to claim 9, wherein said step of transmitting occurs over a frequency band selected from the group consisting of radio frequency bands, optical frequency bands, and microwave frequency bands.

14. A method according to claim 9, wherein said data further comprises at least one of an uncertainty metric associated with said time-of-transmission, an uncertainty metric associated with said position, a pointing direction of an antenna used during said step of transmitting, a current state estimate of said corresponding one of said assets associated with said data, gravitational information impacting said corresponding one of said assets associated with said data, and said data associated with others of said assets.

15. A method according to claim 9, wherein said step of determining is performed for selected ones of said assets predicated on a plurality of factors to include proximity of said assets to said spacecraft and said assets' type as being one of said planetary assets and said space-based assets.

16. A method of enhancing on-board state estimation for space-based assets, comprising the steps of:
providing a network of assets to include planetary-based assets and space-based assets, each of said assets generating communication signals defined by a common protocol;
embedding data in a parsable portion of each of said communication signals, said data including a time-of-transmission for a corresponding one of said communication signals and a position of a corresponding one of said assets at said time-of-transmission, each said time-of-transmission being synchronized to a space-wide time reference frame, each said position defined in terms of a space-wide location reference frame;
transmitting said communication signals from each of said assets into space at said time-of-transmission associated therewith;
providing a spacecraft in space, said spacecraft being equipped to receive said communication signals and transmit own-spacecraft communication signals into space, said spacecraft having a clock synchronized to said space-wide time reference frame for generating a time-of-receipt for each of said communication signals received by the spacecraft and having a processor programmed to generate state estimates of said spacecraft;
determining, using said processor, one-dimensional range from said spacecraft to at least one of said assets, said step of determining using said data from said communication signals transmitted by said at least one of said assets and each said time-of-receipt associated therewith;
updating, using said processor, said state estimates using each said one-dimensional range, wherein an updated state estimate is generated, and wherein said updated state estimate includes an updated position for said spacecraft;
embedding, in one of said own-spacecraft communication signals, said updated position for said spacecraft and a current time-of-transmission from said clock; and
transmitting, from said spacecraft, said one of said own-spacecraft communication signals wherein said updated position and said current time-of-transmission are available for use by said assets in updating said position thereof used in said step of embedding data.

17. A method according to claim 16, wherein said step of transmitting is carried out in accordance with a delay and disruption-tolerant networking protocol.

18. A method according to claim 16, wherein said space-wide time reference frame comprises a Barycentric Dynamical Time reference frame.

19. A method according to claim 16, wherein said step of transmitting occurs over a frequency band selected from the group consisting of radio frequency bands, optical frequency bands, and microwave frequency bands.

20. A method according to claim 16, wherein said data further comprises at least one of an uncertainty metric associated with said time-of-transmission, an uncertainty metric associated with said position, a pointing direction of an antenna used during said step of transmitting, a current state estimate of said corresponding one of said assets associated with said data, gravitational information impacting said corresponding one of said assets associated with said data, and said data associated with others of said assets.

21. A method according to claim 16, wherein said step of determining is performed for selected ones of said assets predicated on a plurality of factors to include proximity of said assets to said spacecraft and said assets' type as being one of said planetary assets and said space-based assets.

* * * * *